Sept. 25, 1934.  E. J. KINGSBURY  1,975,008
MACHINE TOOL HAVING AN INDEXING MOVEMENT
Filed Aug. 3, 1933  6 Sheets-Sheet 1

Inventor:
Edward J. Kingsbury,
By
Attorneys.

Sept. 25, 1934.　　　　　E. J. KINGSBURY　　　　　1,975,008
MACHINE TOOL HAVING AN INDEXING MOVEMENT
Filed Aug. 3, 1933　　　　　6 Sheets-Sheet 2

Inventor:

Edward J. Kingsbury,

By
Attorneys.

Sept. 25, 1934.    E. J. KINGSBURY    1,975,008
MACHINE TOOL HAVING AN INDEXING MOVEMENT
Filed Aug. 3, 1933    6 Sheets-Sheet 3
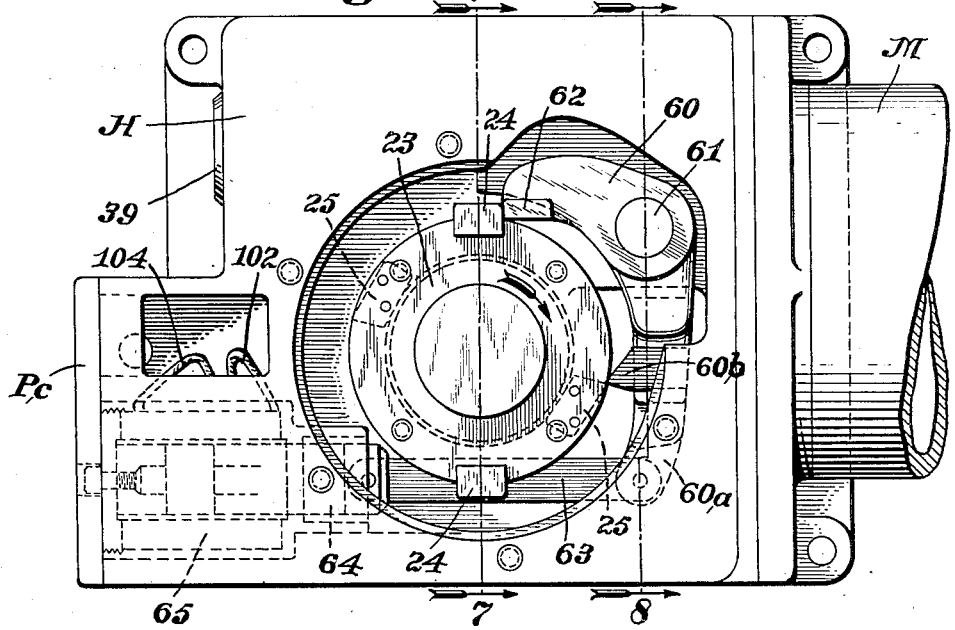
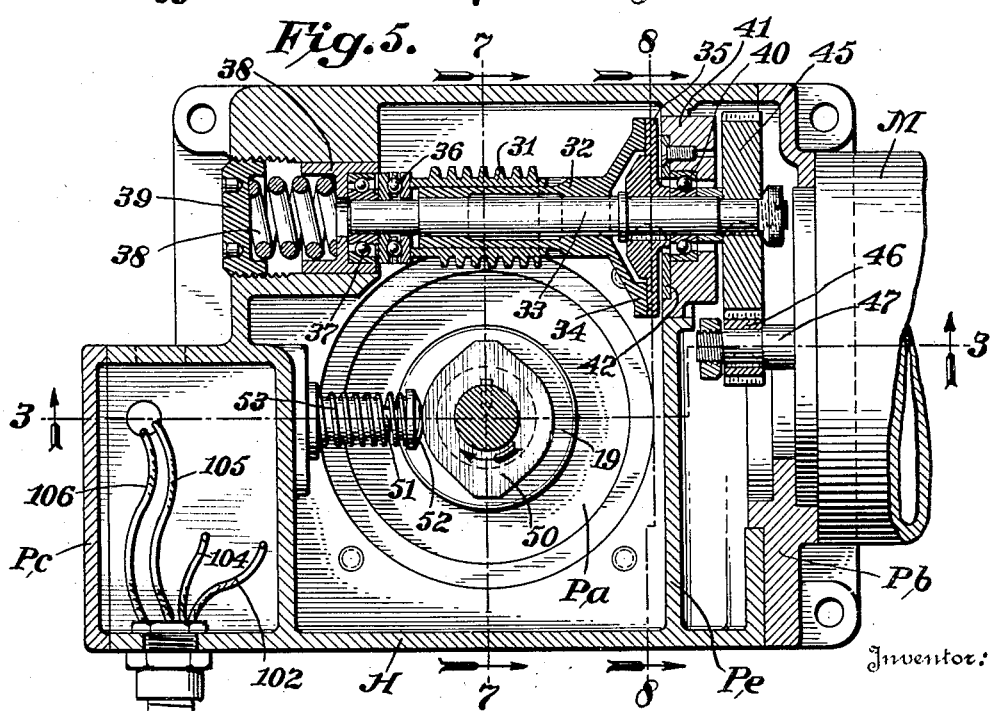
Inventor:
Edward J. Kingsbury,
By
Attorneys.

Sept. 25, 1934.   E. J. KINGSBURY   1,975,008
MACHINE TOOL HAVING AN INDEXING MOVEMENT
Filed Aug. 3, 1933   6 Sheets-Sheet 4

Inventor:
Edward J. Kingsbury,
By
Attorneys.

Sept. 25, 1934.  E. J. KINGSBURY  1,975,008
MACHINE TOOL HAVING AN INDEXING MOVEMENT
Filed Aug. 3, 1933  6 Sheets-Sheet 5

Inventor:
Edward J. Kingsbury,
By
Attorneys.

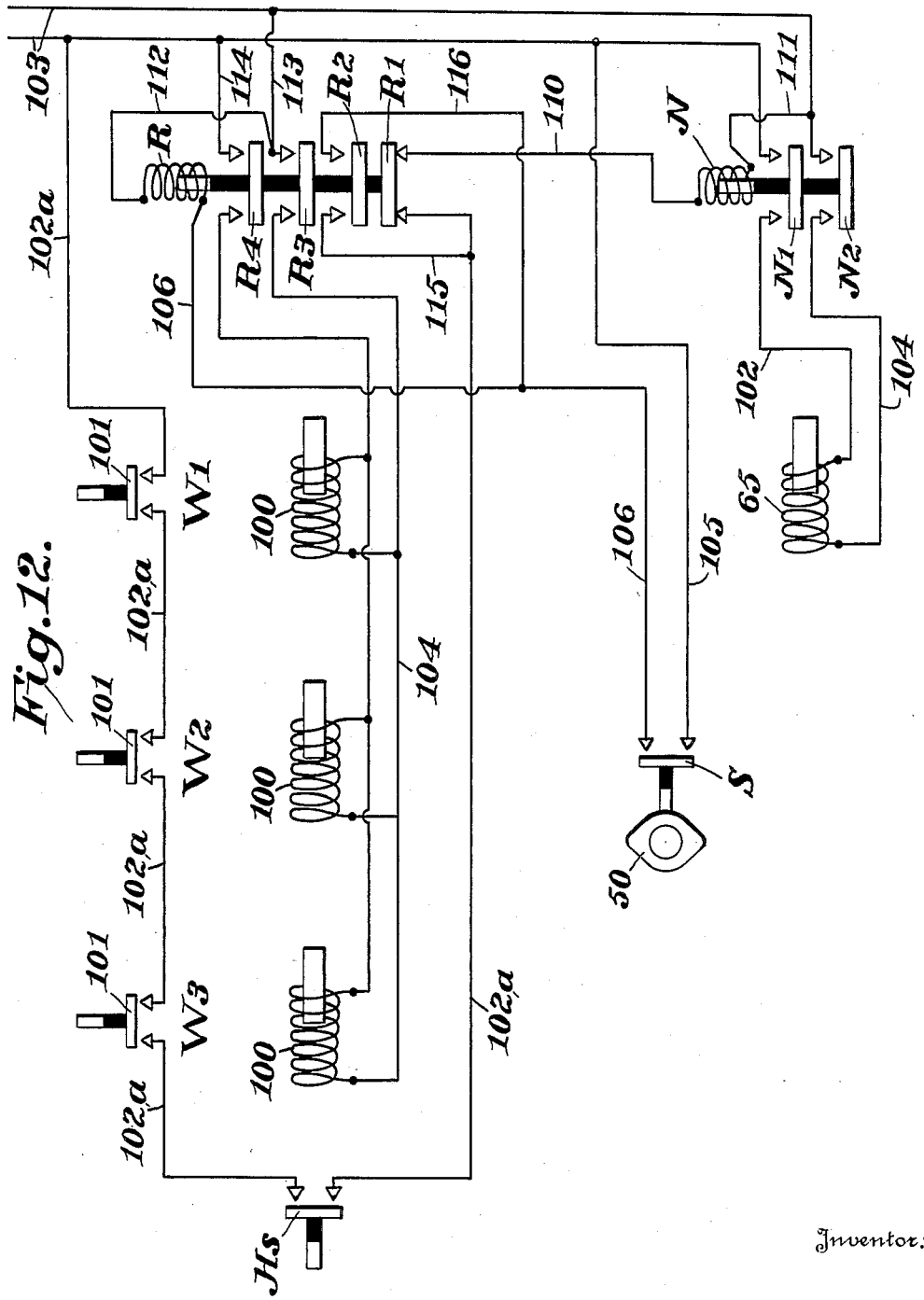

Patented Sept. 25, 1934

1,975,008

UNITED STATES PATENT OFFICE

1,975,008

MACHINE TOOL HAVING AN INDEXING MOVEMENT

Edward Joslin Kingsbury, Keene, N. H., assignor to Kingsbury Machine Tool Corporation, Keene, N. H., a corporation of New Hampshire Application August 3, 1933, Serial No. 683,541

22 Claims. (Cl. 29—50)

The present invention relates to improvements in machine tools of the type having indexing movement, and is more particularly directed to a machine tool comprising a general support structure having a turret, an indexing unit for moving said turret, one or more tool units for operating upon work supported by the turret, and control means for associating the units.

One feature of the present invention is a machine tool including one or more work units and an index unit for presenting articles upon which work is to be done to the work units; the index unit having a driving and operating mechanism which during its cyclic movement initiates the release of the work units, and means are provided for maintaining this release until the work units have begun their feeding movement.

Another feature is the provision of a unit for producing an indexing movement of predetermined degree at a desired time, which may be assembled into machine tools of various types.

Another feature of the present invention is the provision of an indexing unit of simple and compact construction and including a source of power, a release means for disengaging the source of power from the driven mechanisms at predetermined times, remotely controlled means for blocking the mechanisms at the completion of each indexing movement, and devices for controlling the movement of work units associated in the machine tool with the indexing unit of the present type.

Other features of the present invention relate to details of construction as will appear in the course of the following specification and claims.

An illustrative form of constructing the indexing unit, along with the manner in which it may be associated in machine tools, is illustrated on the accompanying drawings in which:—

Figure 4 is a top plan view of the indexing unit, with the turret table and the driving plate omitted.

Figure 5 is a horizontal sectional view substantially on line 5—5 of Figure 3.

Figure 12 is a circuit diagram.

Figure 1:
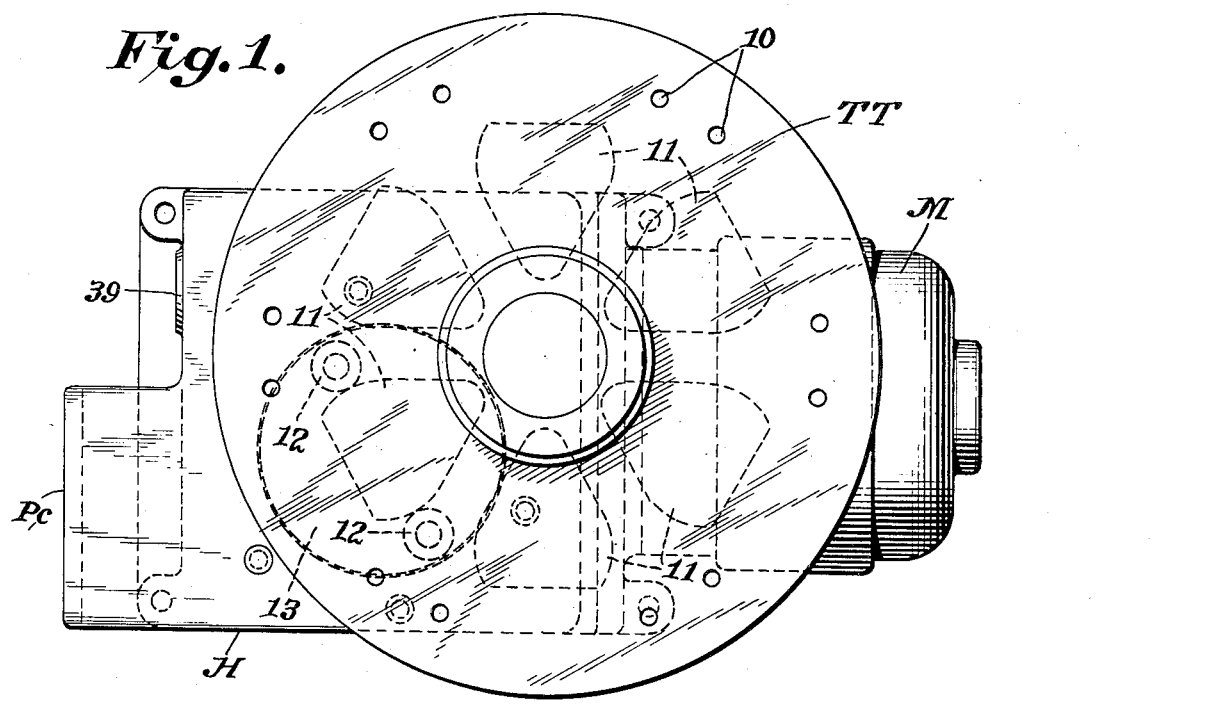
Figure 1 is a top plan view of a turret table mounted upon and in driven relationship with a turret unit.
Figure 2:
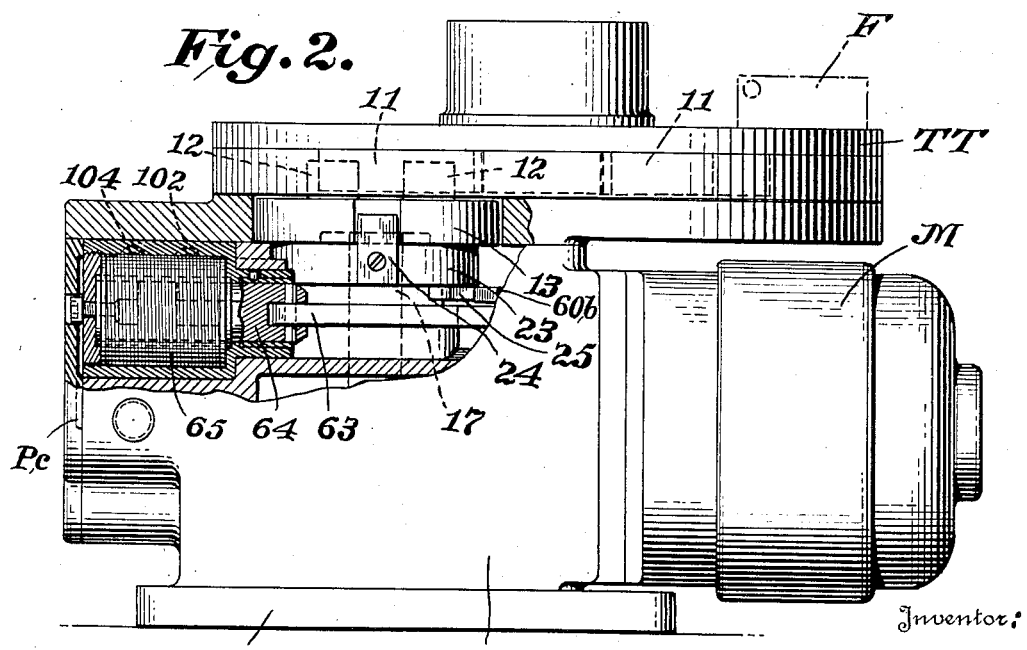
Figure 2 is a side elevation of the same.

In these drawings, the turret table TT is shown as mounted for movement about a vertical axis. In this illustrative showing, the turret table TT is provided with six stations at which may be provided work holding fixtures F, which may be secured, for example, by bolts entering the sets of holes 10 (Fig. 1). Likewise, the turret table TT is provided on its lower surface with six plates 11 which cooperate with the turning rolls 12 mounted on the turret driving plate 13.

The operation of the present indexing unit is to cause this plate 13 to turn through 180° and then come to a standstill. During this movement, the rollers 12 shift their relative positions, and cause the turret table TT, through the action of these rollers upon the plates 11, to move through one-sixth of a revolution and thus bring the next station forward for operation. The index unit is then brought to a standstill with the rollers in the position shown in Figure 1, engaged with opposite faces of a plate 11, for example, for holding the turret table TT in position. This particular arrangement is illustrative only, and any other manner of connecting the indexing unit to the turret table may be employed, and this turret table may be provided with associated devices of proper type for holding the work, and for latching the table when it is at a standstill.

The indexing unit per se comprises a housing H having a bottom closing plate Pa, an end closing plate Pb forming a motor support, and a closing plate Pc for providing access to the wiring as will be described hereinafter. An intermediate web Pd is provided with parts extending in horizontal directions but at different levels, and incorporating a cylindrical flange 15 which receives an upper anti-friction bearing 16 for the vertical indexing shaft 17. This shaft 17 is supported by lower anti-friction bearings 18 in a cylindrical flange 19 of the bottom closing plate Pa. This lower anti-friction bearing 18 is held in position by a screw plug 20 with an associated spacer element, and the nut 21 on shaft 17 serves to prevent upward withdrawal of the shaft 17. The upper anti-friction bearing 16 is maintained in proper position by a spacer 22.

The shaft 17 is preferably formed integral with an indexing flange 23 having two dogs 24 fastened thereon at diametrically opposite points. These dogs extend above the general surface of the top of housing H and the flange 23, and also project radially past the peripheral surface of flange 23. The bottom of the flange 23 is provided with a pair of cam pads 25 which are secured thereto at diametrically opposite points (Fig. 4).

The shaft 17 is provided with a worm gear 30 which is in mesh with a worm 31 on a splined portion 32 of a bushing which has a relative rotation about the axis of the counter-shaft 33. The spline 31 is illustrated as integrally formed with a first clutch member 34 adapted for engagement with a second clutch member 35 keyed on shaft 33. The work 31 may react through a thrust bearing 36 (Fig. 5) and a radial bearing 37 against an axially movable slider 38 which is normally forced toward the right (Fig. 5) by a load regulating spring 38 which may be adjusted by an externally accessible plug 39.

Figure 8:
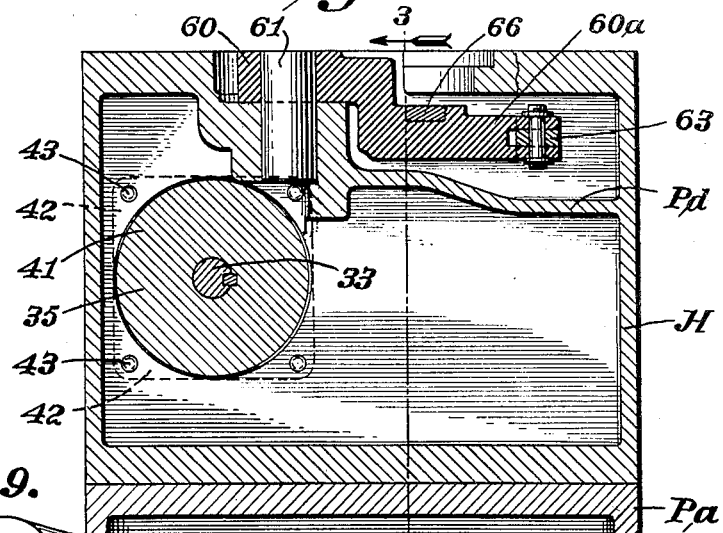
Figure 8 is a similar view substantially on lines 8—8 of Figures 4 and 5.

The radial ball bearing 37 supports the countershaft 33 at one end. A further radial bearing 40 is provided adjacent the other end of the shaft and is supported in a filler member having a cylindrical portion 41 with projecting ears 42 through which cap screws 43 may be passed to secure this member to an intermediate web Pe of the housing H (Fig. 8). The anti-friction bearing 40 is held in position by a pressure ring 42 screwed to member 41.

Counter-shaft 33 has keyed thereto a large gear 45 which is in mesh with a small gear 46 on the shaft 47 of the motor M.

Figure 3:
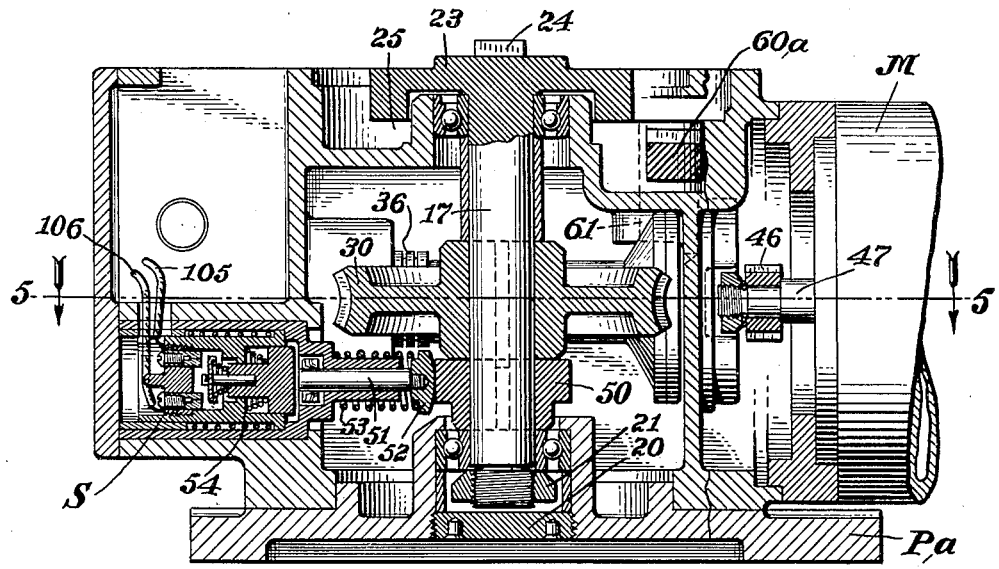
Figure 3 is an upright sectional view through the turret unit substantially on lines 3—3 of Figures 5 and 8.
Figure 6:
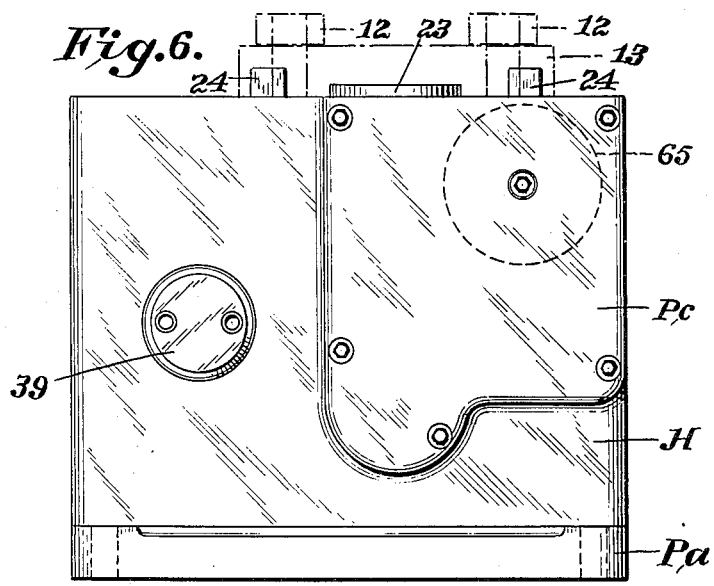
Figure 6 is an end elevation of the same.
Figure 7:
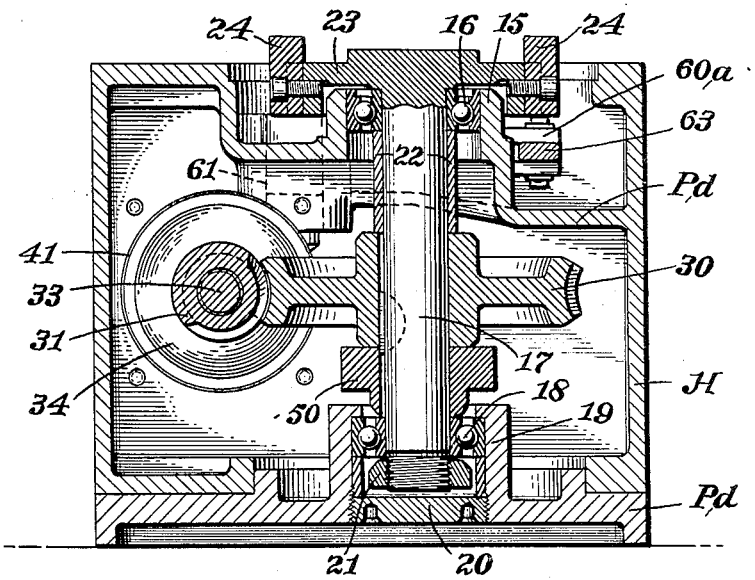
Figure 7 is a transverse sectional view substantially on lines 7—7 of Figures 4 and 5.

The shaft 17 also has keyed thereto a cam piece 50 having diametrically opposite high portions, with diametrically opposite low portions spaced 90° from these high portions. A switch structure S is located in a cavity of the housing H and includes a plunger 51 having a head 52 held in engagement with cam 50 by a spring 53. When the high portion of the cam is opposite the head 52, the plunger is moved toward the left (Figs. 3 and 5) to engage a slider block 54 which closes a circuit between the two terminals in the switch and thus remotely controls an associated structure as will be described hereinafter.

Figure 9:
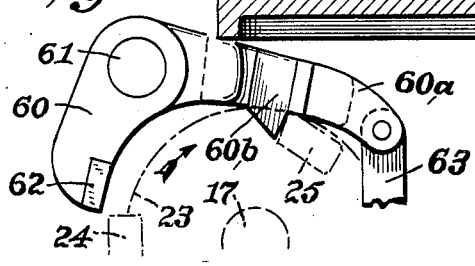
Figure 9 is a diagrammatic detail view of the stop-and-release latch.

A stop-and-start latch 60 is formed as a rocker mounted on a vertical pin 61 supported by housing H. One arm of this latch rocker has a wear plate 62 which engages with the radially projecting portions of the dogs 24 (Figs. 4 and 9). The other arm of the latch rocker 60 preferably is formed with an offset so that its end 60a is well within the housing H, and is pivotally connected to a link 63 which in turn is pivoted to the core or armature 64 slidable within a solenoid winding 65 likewise mounted within the housing H.

The operation of this indexing unit is as follows:

When the machine tool is in operation, the motor M is constantly energized and rotating. Its shaft 47 through gear 46 rotates gear 45, counter-shaft 33, and the second clutch member 35, so that these members continue to turn. When the first clutch member 34 is engaged with the second clutch member 35, the spline 32 is also driven and therewith the worm 31. Worm gear 30 is turned and therewith the shaft 17. The plate 23 and its dogs 24 thus rotate and drive the turret plate 13 and thus move the rollers 12 to accomplish the indexing movement of the turret table TT in the manner described above. Assuming that initially the plate 23 and its dogs 24 were in the position shown in Figure 4 and the latch rocker 60 is in that position, this rotating effect is attained by energization of solenoid 65, with the leftward movement of link 63 and the swinging of latch rocker 60 in a clockwise direction from the position of Figure 4 into the position of Figure 9. This swinging is permitted as the finger 60b is free of the adjacent pad 25.

As the plate 23 turns in a clockwise direction in Figure 4, the opposite pad 25 ultimately encounters the finger 60b and pushes it outward away from the shaft 17 and thus restores the latch rocker 60 to the position of Figure 4, so that it is in the path of the approaching dog 24 and thus operates to bring this dog and the plate 23 to a standstill at a predetermined position which is 180° in advance of the prior position of stoppage.

Since this restoration of the latch rocker 60 occurs just prior to the stoppage of the turret, ample time is afforded for the de-energization of the solenoid winding 65.

The stoppage of plate 23 and its shaft 17 causes the worm 31 to thread itself relative to the stationary worm wheel 30, by moving toward the left (Fig. 5) against the action of spring 38. During at least the first portion of this movement, the spline 32 moves with the worm 31 and thus the clutch members 34 and 35 have a relative axial movement of disengagement. The drive from motor M is thus interrupted and no damage to the parts results while the shaft 17 is at a standstill. Immediately that latch rocker 60 is actuated through link 63, however, the spring 38 forces the worm 31 back toward the right, giving a slight initial rotative movement to the shaft 17, and engaging the clutch members 34 and 35 again for a further half revolution.

Figure 10:
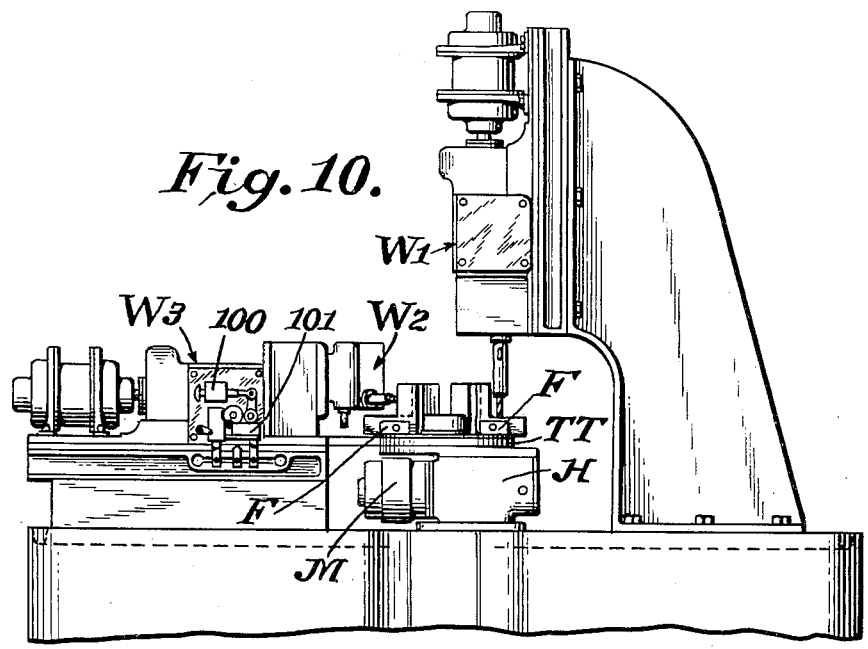
Figures 10 and 11 are respectively a side elevation and a top plan of the assembly of the machine tool having three work units and one indexing unit.
Figure 11:
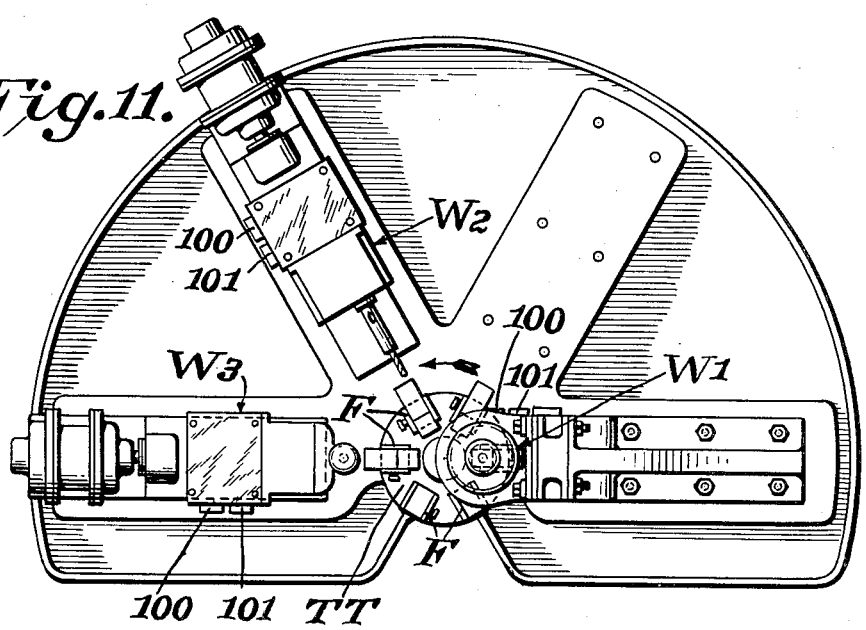

Such a turret unit may be assembled in machine tools of various types, such for example as shown in Figures 10 and 11, in which the turret unit housing H is illustrated in conjunction with a turret table TT and with work units W1, W2, W3, etc. Each of these work units is shown as provided with a solenoid 100 for releasing it at the beginning of a cycle whereby the work unit may make a full cycle of movement and return to its initial position. Each of these work units is also provided with a switch 101 which is closed at the completion of a cycle of movement of the associated work unit.

The switches 101 are all connected in series by a conductor 102a which leads from one conductor of a source of power 103 through the several switches in series, and serve to control the solenoid winding 65 of the turret unit, from which a return conductor 104 leads to the other conductor of the source 103. Correspondingly, the switch S of the indexing unit is connected by a conductor 105 to the source 103 and serves through a conductor 106 to control the energization of the solenoids 100 of the several work units W1, W2, etc., in multiple.

It is preferred to use pilot circuits in conjunction with the switches, and to employ relays energized through these pilot circuits for controlling the current supplied to the solenoids. Such an arrangement is shown in Figure 12 where the supply conductors 103 have a pilot circuit conductor 102a branched therefrom and extending in series relationship to and through the several switches 101 of the work or head units W1, W2, etc., and also through a hand tripped switch Hs and thence through the relay bridge R1 which is closed when the relay coil R is de-energized and thence by conductor 110, coil N of the indexing relay and by conductor 111 back to the supply conductors 103. Coil N of this relay is energized and closes its bridges N1, N2, and supply conductors 103 are connected to conductors 102, 104 and current flows through the solenoid winding 65 to start the index unit. Obviously, this cannot occur unless the relay winding R is de-energized, and the switches 101 of all work units are closed.

During the rotating movement of the indexing shaft, the cam 50 closes the switch S whereby current may flow from a supply conductor 103 by conductor 105, switch S, conductor 106, relay coil R, conductors 112 and 113 back to the other supply conductor 103. Relay coil R is energized and relay bridges R1, R2, R3, R4 are raised. In this condition, the circuit through relay coil N is broken at bridge R1 and the turret thus cannot be started until coil R is de-energized again. Bridges R3 and R4 connect conductors 113, 114 which are branched from the supply conductors 103 to conductors 104 and thus in multiple to all the solenoids 100 in the work units W1, W2, etc., so that these work units are started in unison. Also a further circuit is established at bridge R2 from supply conductor 103 by conductor 115, bridge R2, conductor 116, conductor 106, and thus through the coil R as before to hold this relay in closed position.

The relay coil R is now energized and the relay coil N is de-energized. Solenoids 100 have been energized and are maintained energized so that the work units W1, W2, etc., are maintained in tripped condition. The solenoid 65 is de-energized at the indexing relay, since coil N is de-energized. The indexing unit has therefore been stopped. After the work units begin their motion, the control switch 101 in each work unit is opened, or the hand control switch Hs is open; and thus the circuit including conductor 102a is broken and relay coil R is de-energized again. The solenoids 100 in the work units are thus de-energized at the bridges controlled by relay coil R and the trip levers in the several work units returned to the proper position for stopping the work units individually at the completion of the cycle of movement of each work unit. As each work unit completes its cycle and is relatched, the switch 101 in the particular work unit is closed. When all of these work units have returned to latched final position, the pilot circuit is re-established to the hand switch Hs. If this hand switch is held closed, an indexing occurs at succeeding cycles of movement of the individual work units. If the hand switch is open, a momentary closure of it will initiate an indexing and working operation. The mechanism is thus adapted to fully automatic or semi-automatic operation by simple control of the hand switch Hs.

Thus it will be seen that the structure embodies an assembly in which the work units are maintained tripped until the movement of at least the particular head is started. In practice, the indexing movement usually requires less than one-half of a second, and with a small machine this time may be less than one-fourth of a second. Thus the cam 50 gives merely a momentary impulse to switch S for closing the pilot circuit controlled thereby, and the duration of this contact period may not be more than one-thirtieth of a second, i. e. a time insufficient for the normal tripping of the latches which retain the work units by energization of the solenoids 100 thereof. According to the present arrangement, therefore, the momentary impulse attained by the closing of switch S is used to energize the relay coil R and then a holding circuit maintains the relay closed until the work units have begun their movement.

It is obvious that the invention is not limited to the particular form of construction shown, but that it may be modified in many ways within the scope of the appended claims.

Having thus described the invention, what I claim as new and desire to secure by Letters Patent, is:—

1. An indexing unit comprising a shaft having means for rotating a turret, a worm wheel on said shaft, a worm in mesh with said worm wheel, means including a clutch for rotating said worm, a spring for moving said worm axially, a releasable latch for preventing the rotation of said shaft whereby said worm is caused to move axially by reaction of said worm wheel to open said clutch, means carried with said shaft to move said latch into preventing position, and means for moving said latch to releasing position.

2. An indexing unit comprising a shaft having means for rotating a turret, a worm wheel on said shaft, a worm in mesh with said worm wheel, means including a clutch for rotating said worm, a spring for moving said worm axially, a releasable latch for preventing the rotation of said shaft whereby said worm is caused to move axially by reaction of said worm wheel to open said clutch, and solenoid means for moving said latch to releasing position.

3. An indexing unit comprising a shaft having a flange thereon, a dog projecting axially and radially from said flange, a releasable latch for engaging the radial projection of said dog, the axial projection of said dog being operative to rotate a turret, means for rotating said shaft and including a slip clutch for interrupting the drive when said latch engages the dog, and means for releasing the clutch.

4. An indexing unit comprising a shaft having means for rotating a turret, a worm wheel on said shaft, a cam on said shaft, a worm in mesh with said worm wheel, means including a clutch for rotating said worm, a spring for moving said worm axially, a releasable latch for preventing the rotation of said shaft whereby said worm is caused to move axially by reaction of said worm wheel to open said clutch, and a switch closed by said cam at a predetermined position of said shaft, and means for moving said latch to releasing position.

5. A machine tool including at least one work unit having a latching means for detaining it at the close of a cycle of movement, a solenoid for releasing said latching means, and a switch closed substantially at the close of said cycle; a turret table for presenting a piece of work at a station adjacent said work unit, and for presenting it at a station remote from said work unit; an indexing unit including a shaft connected for intermittently moving a piece of work from the remote station to said adjacent station and then to said remote station, a cam on said shaft, a switch closed by said cam at a predetermined position of said shaft, a releasable latch for preventing rotation of the shaft, means for driving said shaft including a slip clutch, a solenoid for releasing said latch; a source of electric current, first circuit means for connecting said work unit switch to said source and said indexing unit solenoid, and second circuit means for connecting said indexing unit switch to said source and said work unit solenoid.

6. A machine tool as in claim 5, including a manually operable switch for controlling said first circuit means whereby the turret movement may be initiated manually when the work unit has completed its cycle, said indexing unit and work unit thereupon beginning and completing a cycle independent of said switch.

7. A self-contained indexing unit including a housing, a constantly rotating driving motor having its frame connected to said housing, a shaft in said housing and having means for turning a turret, means for connecting said motor and shaft and including a slip connection whereby said shaft may be stopped while the motor continues to turn, means for stopping the shaft after a predetermined angular movement, and remotely operable means for moving said stopping means to initiate a new cycle of movement of said shaft.

8. A machine tool including at least one cyclically operating work unit having self-contained driving and feeding mechanisms, means for stopping the feeding at the completion of a cycle of operation, and a mechanism for effecting the starting of a new cycle, a work supporting turret, an index unit independent of the said driving and feeding mechanisms for indexing said turret, means actuated by said indexing unit for controlling said starting mechanism, and means for maintaining said starting mechanism in starting position until the work unit has begun to move.

9. A self-contained turret indexing unit including an electric motor, a shaft having means for turning the turret, means for driving the shaft from said motor, a device for positively stopping the shaft in a set position after a predetermined angular movement thereof, and control means including a remotely energizable circuit and means for moving said device out of stopping position for producing a further movement of said shaft.

10. A self-contained turret indexing unit including an electric motor, a shaft having means for turning the turret, means for driving the shaft from said motor, a device for positively stopping the shaft in a set position after a predetermined angular movement thereof, and means electrically controllable in its action from a remote point for moving said stopping device out of its stopping position.

11. A self-contained turret indexing unit including an electric motor, a shaft having means for turning the turret, means for driving the shaft from said motor, a device for positively stopping the shaft in a set position after a predetermined angular movement thereof, means controllable in its action from a remote point for moving said stopping device out of its stopping position, and means operated during the movement of said shaft for restoring said stopping device to its stopping position.

12. An indexing unit comprising a turret and means for intermittently rotating said turret including a power-operated shaft, held against axial movement, a driven shaft in axial alinement therewith, clutch members carried by the adjacent ends of said shafts, yielding means for moving the driven shaft axially for causing engagement of the clutch members, a driving connection between the driven shaft and the turret constructed and disposed so that the driving torque tends to move said driven shaft axially for releasing the clutch members, a control latch for preventing the rotation of the turret whereupon the driving torque will release the driving connection between the clutch members, said yielding means operating upon the release of the latch to establish driving connection of said clutch members, means for moving said latch to releasing position, and means movable with said turret for returning the control latch to a position for stopping the turret when the operating means therefor has completed a cycle.

13. An indexing unit comprising a turret and means for intermittently rotating said turret including a power-operated shaft, held against axial movement, a driven shaft in axial alinement therewith, clutch members carried by the adjacent ends of said shafts, yielding means for moving the driven shaft axially for causing engagement of the clutch members, a worm on said driven shaft, a worm wheel meshing therewith and connected to said turret for rotating the same, said worm and worm wheel being constructed so that the driving torque tends to move said driven shaft axially for releasing the clutch members, a control latch for preventing the rotation of the turret whereupon the driving torque will release the driving connection between the clutch members, said yielding means operating upon the release of the latch to establish driving connection of said clutch members, means for moving said latch to releasing position, and means movable with said turret for returning the control latch to a position for stopping the turret when the operating means therefor has completed a cycle.

14. An indexing unit comprising a turret and means for intermittently rotating said turret including a power-operated shaft held against axial movement, a driven shaft in axial alinement therewith, clutch members carried by the adjacent ends of said shafts, yielding means for moving the driven shaft axially for causing engagement of the clutch members, a driving connection between the driven shaft and the turret constructed and disposed so that the driving torque tends to move said driven shaft axially for releasing the clutch members, a control latch for preventing the rotation of the turret whereupon the driving torque will release the driving connection between the clutch members, said yielding means operating upon the release of the latch to establish driving connection of said clutch members, a solenoid, means connecting said solenoid to said latch and operating when said solenoid is energized for releasing the latch, and a switch for controlling the circuit through said solenoid.

15. An indexing unit comprising a turret and means for intermittently rotating said turret including a power-operated shaft held against axial movement, a driven shaft in axial alinement therewith, clutch members carried by the adjacent ends of said shafts, yielding means for moving the driven shaft axially for causing engagement of the clutch members, a driving connection between the driven shaft and the turret constructed and disposed so that the driving torque tends to move said driven shaft axially for releasing the clutch members, a control latch for preventing the rotation of the turret whereupon the driving torque will release the driving connection between the clutch members, said yielding means operating upon the release of the latch to establish driving connection of said clutch members, means for moving said latch to releasing position, means movable with the latch and operable by the turret for shifting the latch to a position for stopping the turret at the completion of a cycle of movement of the turret.

16. An indexing unit comprising a turret and means for intermittently rotating said turret including a power-operated shaft held against axial movement, a driven shaft in axial alinement therewith, clutch members carried by the adjacent ends of said shafts, yielding means for moving the driven shaft axially for causing engagement of the clutch members, a driving connection between the driven shaft and the turret constructed and disposed so that the driving torque tends to move said driven shaft axially for releasing the clutch members, a control latch for preventing the rotation of the turret whereupon the driving torque will release the driving connection between the clutch members, said yielding means operating upon the release of the latch to establish driving connection of said clutch members, means for moving said latch to releasing position, means movable with the latch and operable by the turret for shifting the latch to a position for stopping the turret at the completion of a cycle of movement of the turret, a solenoid connected to said latch and operating when energized for moving said latch to a releasing position, and a switch for controlling said solenoid.

17. An indexing unit comprising a turret, an operating shaft for intermittently rotating said turret, a flange mounted on said operating shaft, a dog carried by said flange, a rocker mounted adjacent the turret, a latch plate carried by said rocker and adapted to be moved into the path of travel of the dog for stopping the operating shaft, a solenoid connected to said rocker and operating when energized to release the latch from the path of travel of the dog, means carried by said flange and adapted to engage said rocker for returning the latch plate to a position for contact with the dog for stopping the operating shaft at the end of a feed cycle, and means for rotating said operating shaft including a slip clutch for interrupting the drive when the latch plate engages the dog.

18. An indexing unit comprising a turret, an operating shaft for intermittently rotating said turret, a flange mounted on said operating shaft, a dog carried by said flange, a rocker mounted adjacent the turret, a latch plate carried by said rocker and adapted to be moved into the path of travel of the dog for stopping the operating shaft, a solenoid connected to said rocker and operating when energized to release the latch from the path of travel of the dog, a cam pad carried by said flange, a finger carried by said rocker and adapted to engage said cam pad, said cam pad and finger being disposed so as to return said latch plate into the path of travel of the dog so that said dog will contact therewith at the end of a feed cycle and stop the turret, and means for rotating said operating shaft including a slip clutch for interrupting the drive when the latch plate engages the dog.

19. An indexing unit comprising a turret, an operating shaft for intermittently rotating said turret, a flange mounted on said operating shaft, a dog carried by said flange, a rocker mounted adjacent the turret, a latch plate carried by said rocker and adapted to be moved into the path of travel of the dog for stopping the operating shaft, a solenoid connected to said rocker and operating when energized to release the latch from the path of travel of the dog, means carried by said flange and adapted to engage said rocker for returning the latch plate to a position for contact with the dog for stopping the operating shaft at the end of a feed cycle, a worm wheel fixed to said operating shaft, a motor-driven shaft held against axial movement, a driven shaft in axial alinement with the motor-driven shaft, clutch members carried by the adjacent ends of said last-named shafts, yielding means for moving the driven shaft axially for causing engagement of the clutch members, a worm carried by said driven shaft and meshing with said worm wheel, said worm and worm wheel being constructed so that the driving torque tends to move the driven shaft axially for releasing the clutch members.

20. An indexing unit comprising a turret, an operating shaft for intermittently rotating said turret, a flange mounted on said operating shaft, a dog carried by said flange, a rocker mounted adjacent the turret, a latch plate carried by said rocker and adapted to be moved into the path of travel of the dog for stopping the operating shaft, a solenoid connected to said rocker and operating when energized to release the latch from the path of travel of the dog, a cam pad carried by said flange, a finger carried by said rocker and adapted to engage said cam pad, said cam pad and finger being disposed so as to return said latch plate into the path of travel of the dog so that said dog will contact therewith at the end of a feed cycle and stop the turret, a worm wheel fixed to said operating shaft, a motor-driven shaft held against axial movement, a driven shaft in axial alinement with the motor-driven shaft, clutch members carried by the adjacent ends of said last-named shafts, yielding means for moving the driven shaft axially for causing engagement of the clutch members, a worm carried by said driven shaft and meshing with said worm wheel, said worm and worm wheel being constructed so that the driving torque tends to move the driven shaft axially for releasing the clutch members.

21. A self-contained turret indexing unit including an electric motor, a shaft having means for turning the turret, means for rotating the shaft from said motor, a movable abutment for stopping the shaft after a predetermined angular movement thereof, and means for moving said abutment out of stopping position whereby said shaft may be further rotated.

22. A self-contained turret indexing unit including an electric motor, a shaft having means for turning the turret, means for rotating the shaft from said motor, a movable abutment for stopping the shaft after a predetermined angular movement thereof, means for moving said abutment out of stopping position whereby said shaft may be further rotated, and a remotely energizable circuit for initiating further rotation of said shaft.

EDWARD JOSLIN KINGSBURY.